United States Patent
Castrillon et al.

(10) Patent No.: US 9,496,967 B1
(45) Date of Patent: Nov. 15, 2016

(54) CYCLE SLIP COMPENSATION IN COHERENT RECEIVER

(71) Applicant: ClariPhy Communications, Inc., Irvine, CA (US)

(72) Inventors: Mario Alejandro Castrillon, Cordoba (AR); Damian Alfonso Morero, Cordoba (AR); Mario Rafael Hueda, Cordoba (AR)

(73) Assignee: ClariPhy Communications, Inc., Irvine, CA (US)

( * ) Notice: Subject to any disclaimer, the term of this patent is extended or adjusted under 35 U.S.C. 154(b) by 49 days.

(21) Appl. No.: 14/226,387

(22) Filed: Mar. 26, 2014

Related U.S. Application Data

(62) Division of application No. 14/209,867, filed on Mar. 13, 2014.

(60) Provisional application No. 61/784,305, filed on Mar. 14, 2013.

(51) Int. Cl.
*H04B 10/61* (2013.01)
*H04L 1/00* (2006.01)
*H04L 7/00* (2006.01)

(52) U.S. Cl.
CPC ......... *H04B 10/6165* (2013.01); *H04L 1/0054* (2013.01); *H04L 7/0075* (2013.01)

(58) Field of Classification Search
CPC .. H04B 10/142; H04B 10/61; H04B 10/612; H04B 10/616; H04B 10/6165; H04L 1/0045; H04L 1/0054; H04L 7/0075; H04L 27/227; H04L 27/2275; H04L 27/2656; H04L 27/2657; H04L 27/2662; H04L 27/2663; H04L 27/2665

USPC ........ 375/134, 137, 260–262, 325–327, 340, 375/341; 714/794, 795

See application file for complete search history.

(56) References Cited

U.S. PATENT DOCUMENTS

| 5,809,009 A * | 9/1998 | Matsuoka ................. H03J 7/02 370/206 |
| 6,944,122 B2 * | 9/2005 | Shirakata ............ H04L 27/2679 370/208 |
| 2002/0159533 A1 * | 10/2002 | Crawford ............ H04L 27/2657 375/260 |
| 2006/0285599 A1 * | 12/2006 | Seki ...................... H04L 25/022 375/260 |

OTHER PUBLICATIONS

Pfau, T. et al., "Hardware-Efficient Coherent Digital Receiver Concept with Feedforward Carrier Recovery for M-QAM Constellations," Journal of Lightwave Technology, Apr. 15, 2009, pp. 989-999, vol. 27, No. 8.

(Continued)

*Primary Examiner* — Young T Tse
(74) *Attorney, Agent, or Firm* — Fenwick & West LLP

(57) ABSTRACT

A receiver architecture and method recovers data received over an optical fiber channel in the presence of cycle slips. In a first cycle slip recovery architecture, a receiver detects and corrects cycle slips based on pilot symbols inserted in the transmitted data. In a second cycle slip recovery architecture, a coarse cycle slip detection is performed based on pilot symbols and a cycle slip position estimation is then performed based on carrier phase noise. The receiver compensates for cycle slips based on the position estimation.

20 Claims, 8 Drawing Sheets

(56) References Cited

OTHER PUBLICATIONS

United States Office Action, U.S. Appl. No. 14/209,867, Sep. 11, 2015, 8 pages.

Castrillon, M.A. et al., "A New Cycle Slip Compensation Technique for Ultra High Speed Coherent Optical Communications," IEEE Photonics Conference 2012, San Francisco, CA, Sep. 23-27, 2012, IEEE, pp. 175-176.

* cited by examiner

CYCLE SLIP COMPENSATION IN COHERENT RECEIVER

RELATED APPLICATIONS

This application is a divisional of U.S. patent application Ser. No. 14/209,867 entitled "Cycle Slip Compensation in a Coherent Receiver" filed on Mar. 13, 2014, which claims the benefit of U.S. Provisional Application No. 61/784,305 entitled "Cycle Slip Compensation" filed on Mar. 14, 2013 to Mario Alejandro Castrillon, et al., the contents of which are each incorporated by reference herein.

BACKGROUND

1. Field of the Art

The disclosure relates generally to communication systems, and more specifically, to cycle slip compensation in a coherent receiver.

2. Description of the Related Art

The most recent generation of high-speed optical transport network systems has widely adopted receiver technologies with electronic dispersion compensation (EDC). These receivers often use phase encoded modulation formats such as phase shift keying (PSK) or quadrature PSK (QPSK). Carrier phase recovery (CPR) is a key function of coherent optical receivers. CPR algorithms compensate for effects such as laser phase noise and carrier frequency fluctuations. However, since various modulation schemes such as QPSK have rotational symmetry, errors in the carrier phase estimation may cause cycle slips. After a cycle slip occurs, all detected symbols are erroneous and they generally cannot be corrected by forward error correction (FEC) codes. To combat this catastrophic effect, differential modulation is typically used. In differential modulation schemes the information is transmitted as the phase difference between two consecutive symbols. Therefore, the effects of a cycle slip do not translate into catastrophic bit errors when differential modulation is used. However, differential modulation is prone to introduce signal-to-noise ratio (SNR) penalty compared to non-differential schemes, and is therefore an undesirable solution to the cycle slip problem.

SUMMARY

A coherent receiver detects and corrects for cycle slips in a received data stream. A sequence of frames are received with each frame comprising a data symbol block and a pilot symbol block having one or more pilot symbols. A comparison is performed between a sequence of received pilot symbol blocks from the sequence of frames and an expected sequence of pilot symbol blocks. A phase rotation of the sequence of received pilot symbol blocks relative to the expected sequence of pilot symbol blocks is estimated based on the comparison. The estimated phase rotation is applied to a target data symbol block in a target frame of the sequence of frames to generate a compensated data symbol block. The compensated data symbol block is outputted.

In a second embodiment a sequence of frames is received with each frame comprising a data symbol block and a pilot symbol block. The pilot symbol block comprises one or more pilot symbols. The sequence of frames including at least a target frame and a subsequent frame. A first phase rotation of the target frame is estimated based on pilot symbols in the target frame and an expected sequence of pilot symbols. A second phase rotation of the subsequent frame is estimated based on pilot symbols in the subsequent frame and the expected sequence of pilot symbols. Responsive to the first phase rotation not matching the second phase rotation, a location of a cycle slip in the target frame is estimated. The cycle slip is then corrected based on the detected location.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION

A receiver architecture and method for data recovery is described for transmissions received over an optical fiber channel. Cycle slip detection and correction methods detect and correct errors in the recovered data symbols caused by cycle slips. The described methods can beneficially be implemented with a low-complexity forward architecture suitable for high speed parallel implementation. In particular, the described methods can be implemented as a simple post-processing stage after a Viterbi & Viterbi (VV) based carrier phase estimator or any other carrier phase estimator. In one embodiment, a 100 Gb/s DP-QPSK optical system can achieve eliminate or nearly eliminate the performance degradation caused by cycle slips at a post-error correcting bit error rate of $10^{-6}$ with an 1% overhead.

Figure 1:
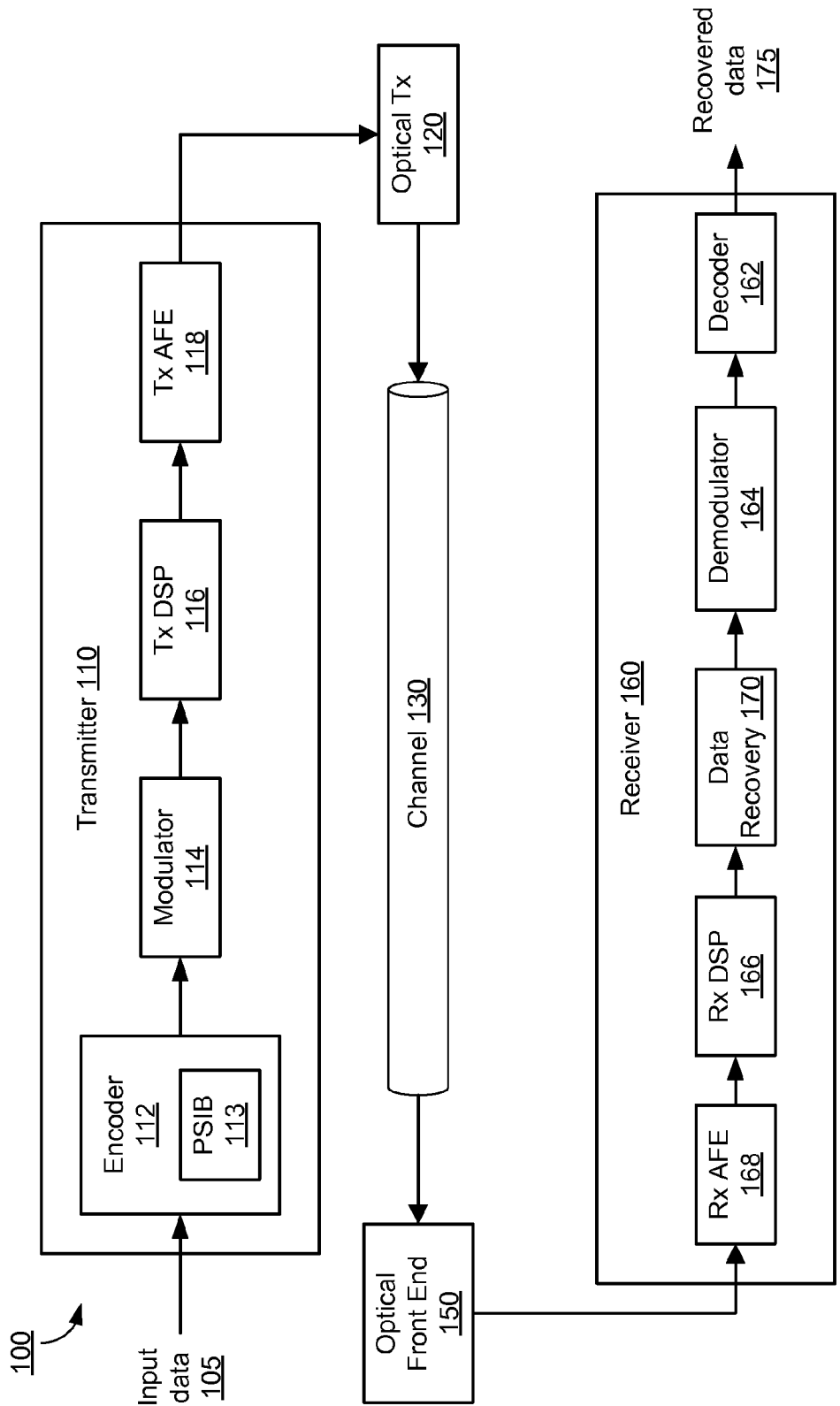
FIG. 1 is a system diagram of an embodiment of an optical communication system.

FIG. 1 is a block diagram of a communication system 100. The communication system 100 comprises a transmitter 110 for encoding data as an electrical signal, an optical transmitter 120 for converting the electrical signal produced by the transmitter 110 to an optical signal suitable for transmission over a communication channel 130, an optical front end 150 for converting the received optical signal to an electrical signal, and a receiver 160 for receiving and processing the electrical signal encoding the data from the optical front end 150. In one embodiment, the communication system 100 comprises an ultra-high speed (e.g., 40 Gb/s, 100 Gb/s, 200 Gb/s or faster) optical fiber communication system, although the described techniques may also be applicable to lower speed optical communication systems.

The transmitter 110 comprises an encoder 112, a modulator 114, a transmitter (Tx) digital signal processor (DSP) 116, and Tx analog front end (AFE) 118. The encoder 112 receives input data 105 and encodes the data for transmission over the optical network. For example, in one embodiment, the encoder 112 encodes the input data 105 using forward error correction (FEC) codes that will enable the receiver 160 to detect, and in many cases, correct errors in the data received over the channel 130. The encoder 112 includes a pilot symbol insertion block (PSIB) 113 to insert pilot symbols in the data stream, which will be used for cycle slip detection and correction in the receiver 160, as will be described in further detail below. The modulator 114 modulates the encoded data via one or more carrier signals for transmission over the channel 130. For example, in one embodiment, the modulator 114 applies phase-shift keying (PSK) to the encoded data. For example, the encoded data may be modulated according to binary phase shift keying (BPSK), quadrature phase shift keying (QPSK), or another modulation scheme. The Tx DSP 116 adapts (by filtering, etc.) the modulator's output signal according to the channel characteristics in order to improve the overall performance of the transmitter 110. The Tx AFE 118 further processes and converts the Tx DSP's digital output signal to the analog domain before it is passed to the optical transmitter (Optical Tx) 120 where it is converted to an optical signal and transmitted via the channel 130. One example of the optical transmitter 120 transmits independent modulations on both polarizations of the optical carrier. An example modulation is QPSK, though other modulations can be used, and the choice can be made to transmit on either one or both polarizations. Although the Tx DSP 116 is illustrated as a separate block from the encoder 112 and modulator 114, in some embodiments all or parts of the encoder 112 and/or modulator 114 may be implemented in the Tx DSP 116 or a separate DSP.

In addition to the illustrated components, the transmitter 110 may comprise other conventional features of a transmitter 110 which are omitted from FIG. 1 for clarity of description. Furthermore, in one embodiment, the transmitter 110 is embodied as a portion of a transceiver device that can both transmit and receive over the channel 130.

The channel 130 may have a limited frequency bandwidth and may act as a filter on the transmitted data. Transmission over the channel 130 may add noise to the transmitted signal including various types of random disturbances arising from outside or within the communication system 100. Furthermore, the channel 130 may introduce fading and/or attenuation effects to the transmitted data. Additionally, the channel 130 may introduce chromatic dispersion (CD) and polarization mode dispersion (PMD) effects that cause a spreading of pulses in the channel 130. Based on these imperfections in the channel 130, the receiver 160 is designed to process the received data and recover the input data 105.

In general, the optical front end 150 receives the optical signal, converts the optical signal to an electrical signal, and passes the electrical signal to the receiver 160. The receiver 160 receives the encoded and modulated data from the transmitter 110 via the optical transmitter 120, communication channel 130, and optical front end 150, and produces recovered data 175 representative of the input data 105. The receiver 160 includes a receiver (Rx) analog front end (AFE) 168, an RX DSP 166, a data recovery system 170, a demodulator 164, and a decoder 162. The Rx AFE 168 samples the analog signal from the optical front end 150 to convert the signal to the digital domain. The Rx DSP 166 further processes the digital signal by applying one or more filters to improve signal quality. A data recovery system 170 compensates for phase and frequency errors in the received data symbols, including detection and correction of cycle slips. Embodiments of a data recovery system 170 are described in further detail below. The demodulator 164 receives the compensated signal from the data recovery system 170 and demodulates the signal. The decoder 162 decodes the demodulated signal (e.g., using error correction codes) to recover the original input data 105. Although the Rx DSP 166 is illustrated as a separate block from the decoder 162, demodulator 164, and data recovery system 170 in some embodiments all or parts of the decoder 162, demodulator 164, and/or data recovery system 170 may be implemented in the Rx DSP 166 or a separate DSP.

In addition to the illustrated components, the receiver 160 may comprise other conventional features of a receiver 160 which are omitted from FIG. 1 for clarity of description. Furthermore, in one embodiment, the receiver 160 is embodied as a portion of a transceiver device that can both transmit and receive over the channel 130.

Components of the transmitter 110 and the receiver 160 described herein may be implemented, for example, as an integrated circuit (e.g., an Application-Specific Integrated Circuit (ASIC) or using a field-programmable gate array (FPGA), in software (e.g., loading program instructions to a processor (e.g., a digital signal processor (DSP)) from a non-transitory computer-readable storage medium and executing the instructions by the processor), or by a combination of hardware and software.

Figure 2:
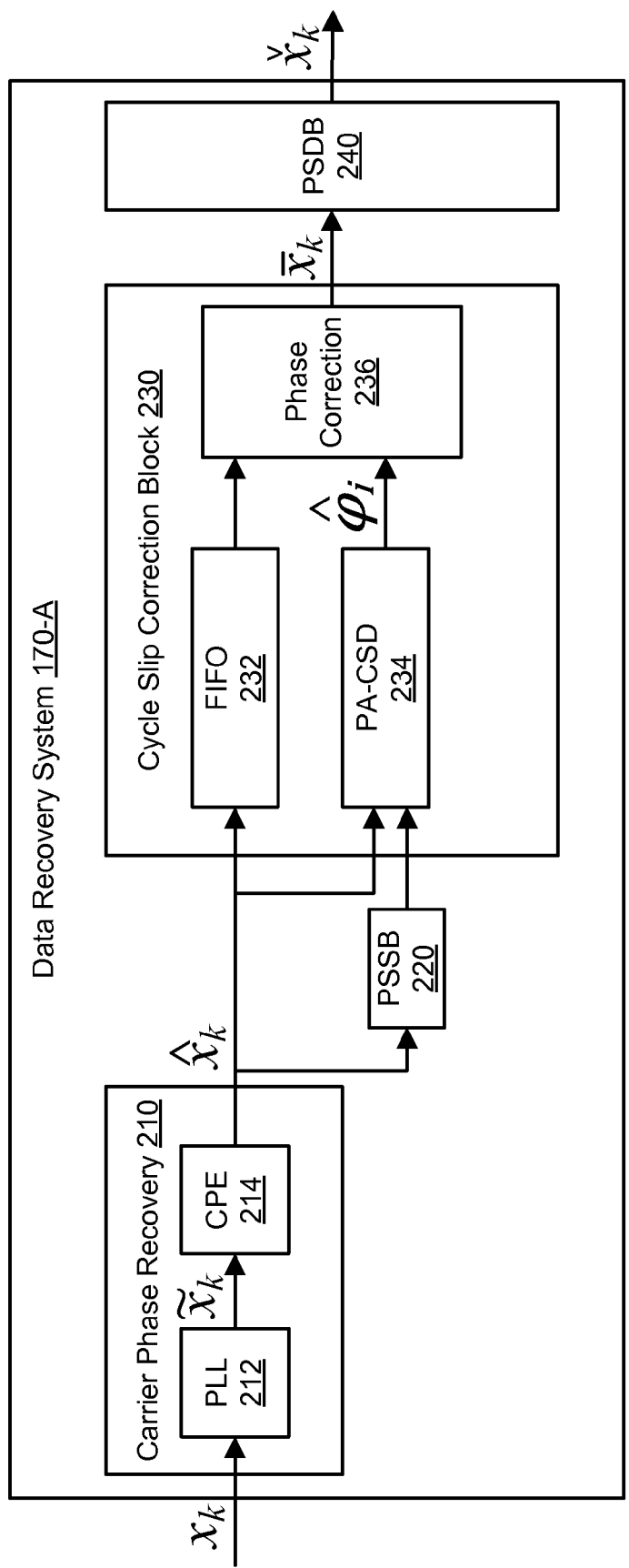
FIG. 2 is a block diagram illustrating a first embodiment of a data recovery system.

FIG. 2 illustrates an embodiment of a data recovery system 170-A. The data recovery system 170-A includes a carrier phase recovery block 210, a pilot symbol synchronization block (PSSB) 220, a cycle slip detection and correction block 230, and a pilot symbol deletion block (PSDB) 240. Components of the data recovery system 170-A may be implemented as hardware, software, or a combination of hardware and software. In one embodiment, the data recovery system 170-A is implemented as instructions stored to a non-transitory computer-readable storage medium that when executed by one or more processors (e.g., a digital signal processor) cause the one or more processors to carry out the functions attributed to the data recovery system described herein.

The carrier phase recovery block 210 comprises a phase locked loop (PLL) 212 (e.g., a low latency PLL) and carrier phase estimator (CPE) 214 (e.g., a Viterbi-Viterbi carrier phase estimator). The PLL 212 and CPE 214 operate to detect and correct for frequency and phase noise in the received data signal. While the PLL 212 and CPE 214 are generally effective at compensating for phase errors less than the constellation rotational-symmetry (for example, 90 degrees in QPSK and 180 degrees in BPSK), the PLL 212 and CPE 214 generally do not correct for full phase errors that map to a different symbol in the constellation based on the rotational symmetry (i.e., cycle slips). Instead, when a cycle slip occurs, the PLL 212 and CPE 214 may map the symbols to the wrong constellation points, thus causing corruption of the data.

The discrete time PLL input signal $x_k$ can be modeled as $$x_k = s_k \cdot e^{j\theta_k} + n_k, \tag{1}$$

where $s_k$ is the complex-valued transmitted symbol at the k-th time instant, $\theta_k$ is the cumulative phase effect due to carrier offset, frequency fluctuations, and laser noise phase; $n_k$ are independent identically-distributed (iid) complex Gaussian random variables with zero mean and variance $N_0/2$ per dimension. The output $\tilde{x}_k$ of the PLL 212 is given by $$\tilde{x}_k = x_k \cdot e^{-j\hat{\theta}_k} = s_k e^{j\psi_k} + \tilde{n}_k, \tag{2}$$

where $\hat{\theta}_k$ is the PLL phase correction, $\psi_k=\theta_k-\hat{\theta}_k$ is the residual phase error, and $\tilde{n}_k=n_k \cdot e^{-k\hat{\theta}_k}$. The output $\hat{x}_k$ of the carrier phase estimator 214 is $$\hat{x}_k = s_k \cdot e^{-j(\psi_k - \hat{\psi}_k)} + \hat{n}_k \qquad (3)$$

where $\hat{\psi}_k$ is the error phase estimated by carrier phase estimator, applying, for example, a Viterbi-Viterbi algorithm, and $\hat{n}_k = \tilde{n}_k \cdot e^{-j\hat{\psi}_k}$.

The cycle slip correction block 230 detects and corrects for cycles slips based on a comparison of a sequence of pilot symbols (e.g., inserted by the pilot symbol insertion block 113 of FIG. 1) in the received data signal to an expected sequence of pilot symbols. In one embodiment, the received data sequence $\hat{x}_k$ at the cycle slip correction block 230 comprises a sequence of data frames, where each data frame comprises a data symbol block comprising one or more data symbols and a pilot symbol block comprising one or more pilot symbols. For example, in one embodiment, each frame includes D data symbols and P pilot symbols, where P≥1 and D≥1. L=D+P represents the total length of each frame including the pilot symbols inserted by the pilot symbol insertion block 113. Therefore, the overhead (OH) of pilot symbols is given by P/D and the throughput expansion rate is given by L/D. The sequence of transmitted pilot symbols can be comprises a predefined sequence (i.e., known by the receiver 160) which may be operator configurable. For example, in one embodiment, the predefined sequence of pilot symbols is generated based on a pseudo random bit sequence (PRBS). In various embodiments, the pilot symbol block may be inserted before or after the data symbol block, or pilot symbols may be interleaved with data symbols.

In one embodiment, P=1 and L=G*S where G is a granularity factor (generally constant) and S is programmable between a range of values and may be received, for example, via a configuration control signal. In one embodiment, S is programmable between 5 and 40. The upper end of the programmable range for S may be configured such that increasing S further ceases to show significant performance improvements in a particular architecture. The lower bound of the range of S may be selected such that decreasing S further may cause the maximum throughput of the chip to be exceeded. In one embodiment, a granularity factor G=4 is used as a factor that provides sufficient flexibility with manageable complexity. Other granularity factors may be used depending on the expected operating conditions and desired design tradeoffs.

The pilot symbol synchronization block 220 finds the position of the inserted pilot symbols in the received sequence of frames. In one embodiment, the pilot symbol synchronization block 220 applies a standard, optimum or sub-optimum, maximum likelihood searching techniques based on the knowledge of the transmitted pilot symbol sequence. In the cycle slip correction and detection block 230, the sequence of data frames are provided to a first-in-first-out (FIFO) buffer 232 and to the Pilot Aided-Cycle Slip Detector (PA-CSD) 234. To process the ith data frame, the PA-CSD 234 observes the sequence of M consecutive received pilot symbol blocks centered (or approximately centered) around the ith frame (e.g., frames i−M/2, . . . , i, . . . , i+M/2) and choose the rotation phase $\hat{\phi}_i$ that maximizes the probability of these M received pilot symbol blocks being rotated by $\hat{\phi}_i$. For example, in the case where P=1, the value of $\hat{\phi}_i$ at the ith sequence of M received pilot symbol blocks is determined as:

$$\hat{\varphi}_i = \arg\max_{\varphi \in \Phi} Prob\left(\hat{x}_{k_{i-\lfloor M/2 \rfloor}} e^{j\varphi}, \ldots, \hat{x}_{k_{i+\lfloor M/2 \rfloor}-1} e^{j\varphi} \mid d_{i-\lfloor M/2 \rfloor}, \ldots, d_{i+\lceil M/2 \rceil -1}\right) \qquad (4)$$

where, Prob(A|B) denotes the conditional probability of A given B, $k_i$ is the time index of the ith pilot symbol, $d_i$ is the ith noiseless pilot symbol, $\hat{x}_{k_i}$ is the received ith pilot symbol, and $\Phi$ is the set of possible phase rotations. For QPSK and QAM modulations, $$\Phi = \left\{0, \frac{\pi}{2}, \pi, -\frac{\pi}{2}\right\}$$

because the constellations have a symmetry of 90 degrees. However, different sets of $\Phi$ are possible depending on the constellation for the applicable modulation scheme. It will be apparent to those of ordinary skill that $\hat{\phi}_i$ can be similarly determined in the case where P≥2.

In one embodiment, a minimum Euclidean distance approach is used to estimate the rotation phase $\hat{\phi}_i$. Here, the rotation phase $\hat{\phi}_i$ is chosen as the rotation phase $\phi_i$ that minimizes the Euclidean distance between the expected sequence of pilot symbols transmitted by the transmitter 110 and the corresponding pilot symbols received at the input of the cycle slip correction block 230 rotated by $\phi_i$. For example, in the case where P=1, the rotation phase $\hat{\phi}_i$ is determined as:

$$\hat{\varphi}_i = \underset{\varphi \in \Phi}{\operatorname{argmin}} \sum_{m=-\lfloor M/2 \rfloor}^{\lceil M/2 \rceil -1} (\hat{x}_{k_{i+m}} \cdot e^{j\varphi} - d_{i+m})^2 \qquad (5)$$

In another embodiment, a slicer-based approach is used. In this embodiment, received symbols are first sliced to map the symbols to the closest point on the symbol constellation. Then the rotation phase $\hat{\phi}_i$ is determined based on the sliced symbols as described in the equations below:

$$\hat{\varphi}_i = \underset{\varphi \in \Phi}{\operatorname{argmin}} \sum_{m=-\lfloor M/2 \rfloor}^{\lceil M/2 \rceil -1} (\operatorname{Slicer}[\hat{x}_{k_{i+m}} \cdot e^{j\varphi}] - d_{i+m})^2 \qquad (6)$$

$$\operatorname{Slicer}[x] = \underset{y \in Q}{\operatorname{argmin}} (x - y)^2 \qquad (7)$$

where Q is the set of possible transmitted constellation points. It will be apparent to those of ordinary skill that $\hat{\phi}_i$ can be similarly determined in the case where P≥2.

In some situations, the slicer-based approach of equations (6)-(7) achieves better performance for high values of M (e.g., above a threshold value of M) while the approach of equation (5) has better performance for low values of M (below the threshold value of M). Thus, the different approaches may be selected depending on the operating conditions and desired design tradeoffs.

The phase correction block 236 receives $\hat{\phi}_i$ and the symbols of the ith frame (temporarily stored in FIFO 232) and rotates the symbols of the ith frame by $\hat{\phi}_i$. For example, in one embodiment, the phase correction block 236 rotates each of the L symbols located at the center (or approximate center) of the M received pilot symbol blocks by the phase angle $\hat{\phi}_i$. The new sequence of symbols, denoted $\bar{x}_k$, is computed as:

$$\bar{x}_k = \hat{x}_k \cdot e^{j\hat{\phi}_i} \text{ for } k = k_{i-1}+1 \ldots, k_i \text{ and all } i \qquad (8)$$

Finally, once the cycle slips are corrected by the cycle slip correction block 230, the pilot symbol deletion block 240 remove the pilot symbol blocks from $\hat{x}_k$ generating a new sequence of symbols $\check{x}_k$. In one embodiment, the phase correction block 236 and pilot symbol deletion block 240 operate in the opposite order or the blocks 236, 240 are combined such that the rotation is performed only on the D data symbols of the ith frame, and not necessarily on the P pilot symbols of the ith frame that will be discarded.

Figure 3:
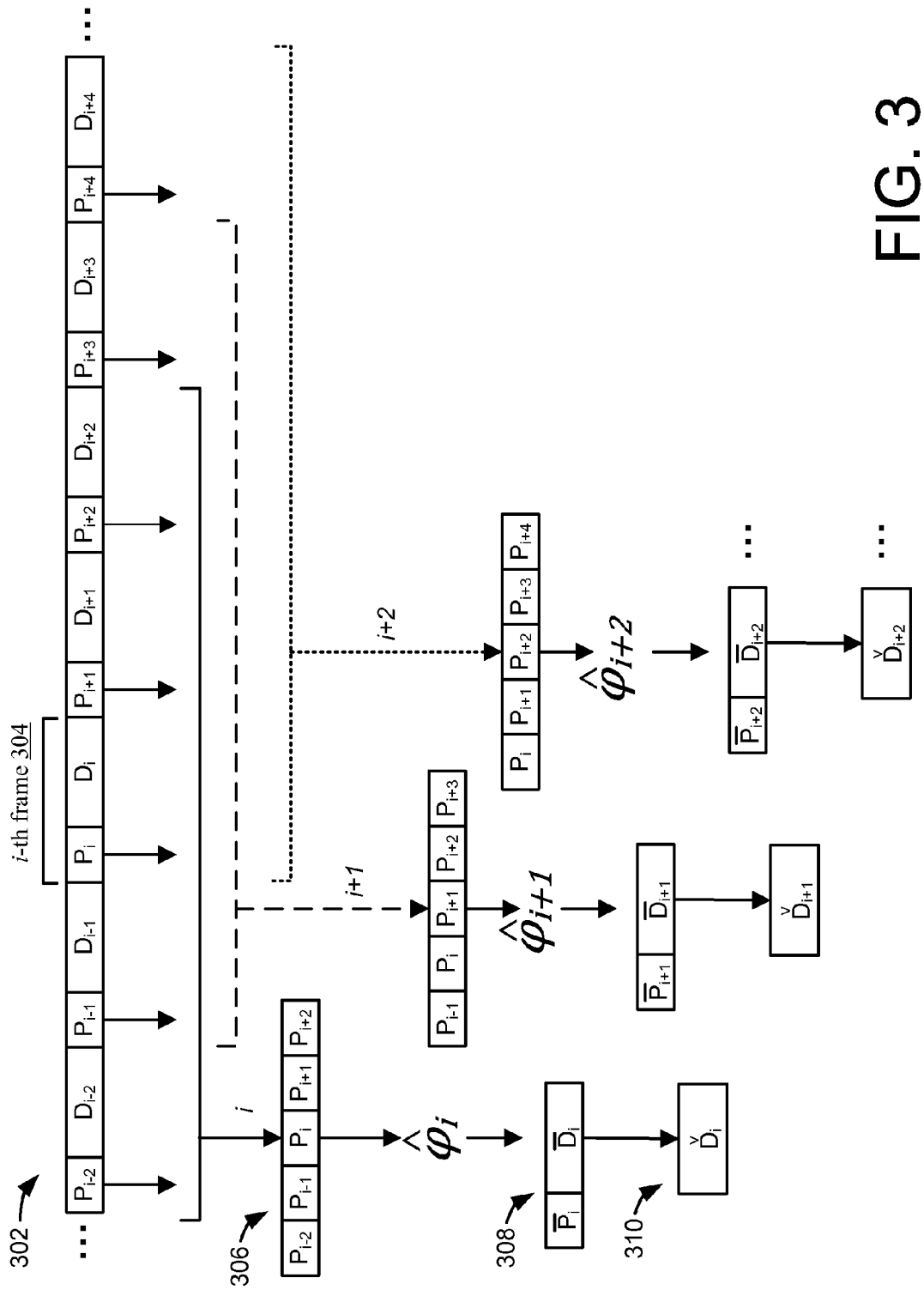
FIG. 3 illustrates an example of data processed at various stages of a data recovery system.

FIG. 3 illustrates an example data sequence processed by the data recovery system 170-A. Here, a sequence of data frames 302 are received with each data frame 304 comprising a pilot symbol block and a data symbol block. To process the ith frame, a sequence of M pilot symbol blocks (e.g., M=5 in the illustrated example) centered around the ith pilot symbol block are extracted. The phase rotation $\hat{\phi}_i$ is then determined based on a comparison of the received pilot symbol blocks to a set of expected pilot symbol blocks. The determined phase rotation $\hat{\phi}_i$ is then applied to the ith data frame to generate a rotated data frame 308. The pilot symbol deletion block 240 then removes the pilot symbol block to generate the ith output data block 310. The process repeats for subsequent data frames.

Although a value of M=5 is shown in the example of FIG. 3, the choice of M may be selected based on various operating conditions and desired tradeoffs. For example, reducing the value of M generally reduces the detection error in the cycle slip position. On the other hand, reducing M also increases the probability of a false cycle slip detection. In one embodiment, a value of M=16 is used. Furthermore, although FIG. 3 shows pilot symbols at the beginning of the frame, in other embodiments, pilot symbols may be inserted at the end or in the middle of the data frame.

Figure 4:
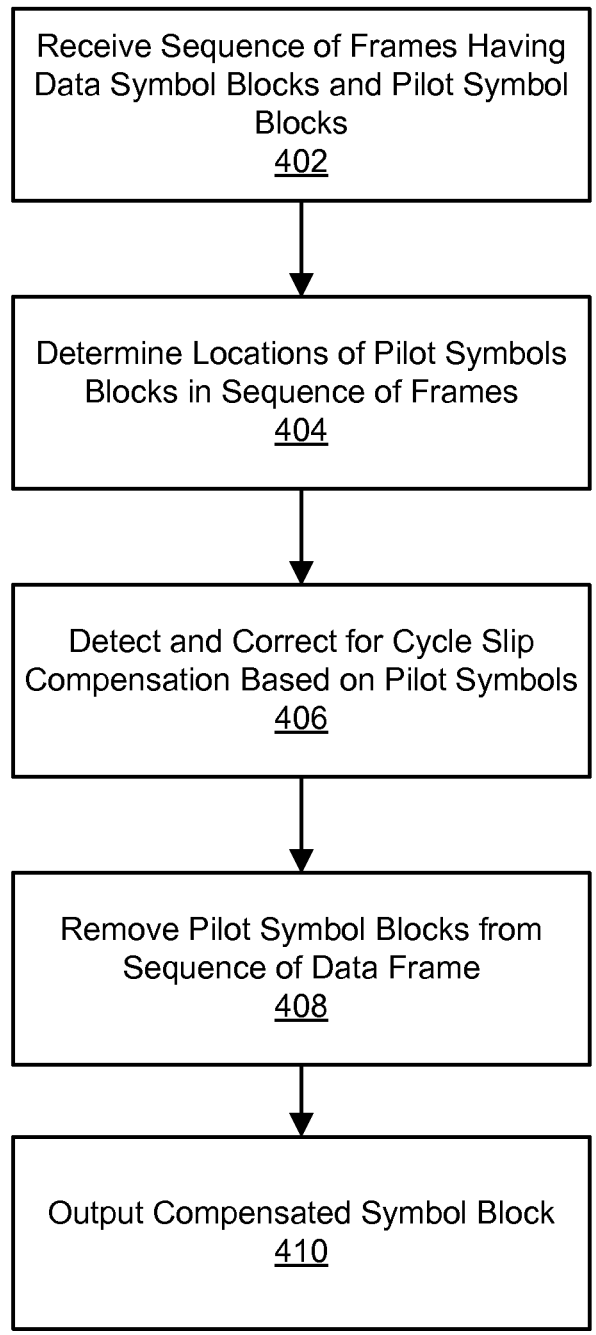
FIG. 4 is a flowchart illustrating an embodiment of a process for recovering data in the presence of cycle slips.

FIG. 4 is a flowchart illustrating an embodiment of a process for recovering data in coherent receiver 160. The data recovery system 170-A receives 402 a sequence of frames having data symbol blocks and pilot symbol blocks. The locations of the pilot symbol blocks are determined 404. The cycle slip correction block 230 then detects and corrects 406 for cycle slips in the sequence of data frames based on the a comparison of the pilot symbols to an expected sequence of pilot symbols. Processes for detecting and correcting for cycle slips are described below with respect to FIG. 4 and FIG. 8. The pilot symbol deletion block 240 deletes 408 the pilot symbols from the corrected sequence of frames. The compensated data blocks are then outputted 410.

Figure 5:
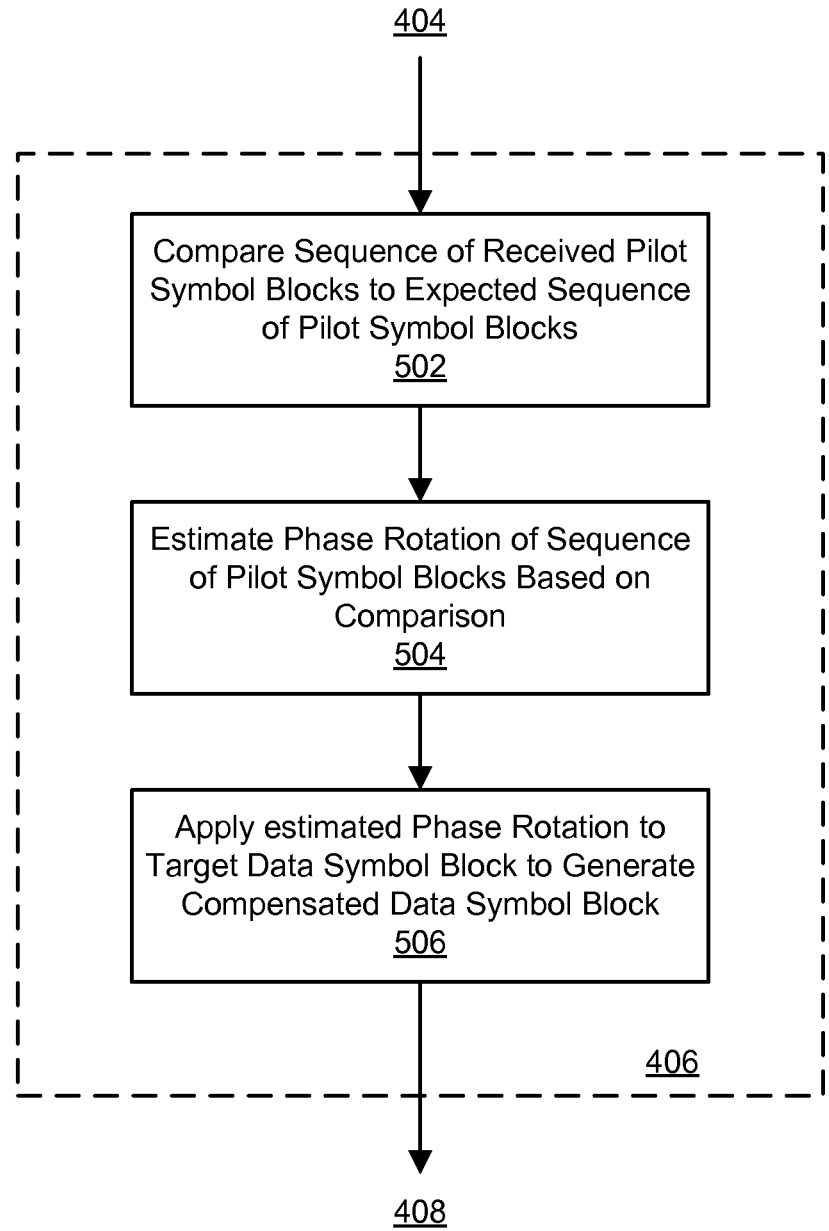
FIG. 5 is a flowchart illustrating a first embodiment of a process for detecting and correcting for cycle slips.

FIG. 5 illustrates an embodiment of a process for detecting and correcting 406 for cycle slips. To detect and correct cycle slips in a target frame (e.g., an ith frame), a sequence of received pilot symbol blocks is compared 502 with an expected sequence of pilot symbol blocks. For example, the compared sequences may have a length of M pilot symbol blocks centered (or approximately centered) around the target (e.g., ith) frame. The phase rotation of the sequence of pilot symbol blocks is estimated 504 based on the comparison using, for example, equations (4)-(7) above. The estimated phase rotation is then applied 506 to the symbols in the target frame. The phase rotation may be applied to the entire frame, or just to the data portion of the frame since the pilot symbols will be discarded.

Figure 6:
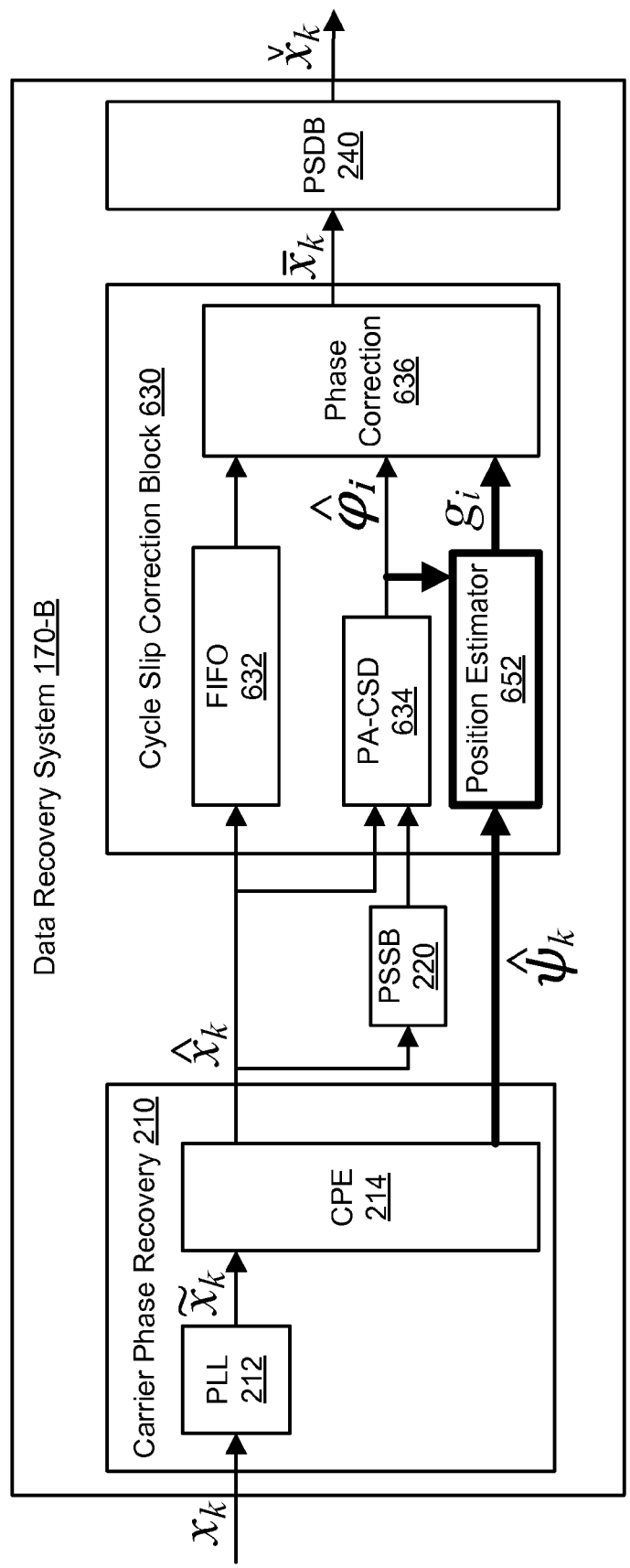
FIG. 6 is a block diagram illustrating a second embodiment of a data recovery system.

FIG. 6 illustrates an alternative embodiment of a data recovery system 170-B. The data recovery system 170-B includes the same elements as data recovery system 170-A of FIG. 2, but has a different architecture in the cycle slip correction block 630. Particularly, in addition to the FIFO 632, phase correction block 636, and PA-CSD 634, the cycle slip correction block 630 of FIG. 6 includes a position fine estimation (PFE) block 652. The PFE block 652 performs a fine estimation of the cycle slip position based on the phase $\hat{\psi}_k$ estimated by the CPE 214. The PA-CSD 634 performs a coarse cycle slip detection based on the pilot symbols. Specifically, the PA-CSD 634, to detect a cycle slip in an ith received frame, the PA-CSD 634 determines a minimum Euclidean distance between the pilot symbols in the ith frame and the corresponding expected pilot symbols. Presuming that the pilot symbols are located at the beginning of each frame, the minimum Euclidean distance can be computed as:

$$\hat{\varphi}_i = \underset{\varphi \in \Phi}{\operatorname{argmin}} \left\{ \sum_{k=i \cdot L}^{i \cdot L+P-1} |\hat{x}_k \cdot e^{j\varphi} - d_k|^2 \right\} \quad (9)$$

where $$\Phi = \left\{ 0, -\frac{\pi}{2}, \frac{\pi}{2}, \pi \right\}$$

is the possible offset produced by a cycle slip, $d_k$ is the $k^{th}$ pilot symbol value, and $\hat{\phi}_i$ indicates the estimated phase offset corresponding to the $i^{th}$ block. When $\hat{\phi}_i \neq \hat{\phi}_{i+1}$, a cycle slip in $i^{th}$ frame is detected. Equation (9) assumes independent identical distributed Gaussian noise. However, depending on the equivalent channel model at the input of the PA-CSD 634, different criteria can be used. The above equation can be easily modified in the case where the pilot symbols are positioned differently within the frame. Once a cycle slip is detected by the PA-CSD 634, the PFE 652 determines the exact position inside the frame. In one embodiment, the PFE 652 compares the phase estimation $\hat{\psi}_k$ from the carrier phase estimator 214 and a delayed version of the phase estimate, $\hat{\psi}_{k-N}$. A cycle slip caused by additive noise generates a fast jump of the phase estimated by the carrier phase estimator 214 in the direction of cycle slip. Therefore, the phase difference $\Delta\hat{\psi}_k$ will have a peak value where the fast jump (i.e., the cycle slip) takes places. On the other hand, a cycle slip caused by a fast change in the phase noise (which generally cannot be tracked by the carrier phase estimator 214) generates a peak value in $\Delta\hat{\psi}_k$ in the direction of cycle slip. Based on these principles, the position of the cycle slip is then estimated as $$g_i = \underset{k \in [i \cdot L, \ldots, (i+1) \cdot L-1]}{\operatorname{argmin}} \left| \left( \Delta\hat{\psi}_{k+\frac{N}{2}} - \Delta\hat{\varphi}_i \right) \operatorname{mod}(\pm\pi) \right| \quad (10)$$

where $\Delta\hat{\psi}_k = \hat{\psi}_{k-N} - \hat{\psi}_k$, $\Delta\hat{\phi} = \hat{\phi}_i - \hat{\phi}_{i+1}$. Parameter N may be determined empirically based on operating conditions and desired tradeoffs. After the cycle slip position is estimated, the cycle slip effect is canceled for the affected symbols.

Figure 7:
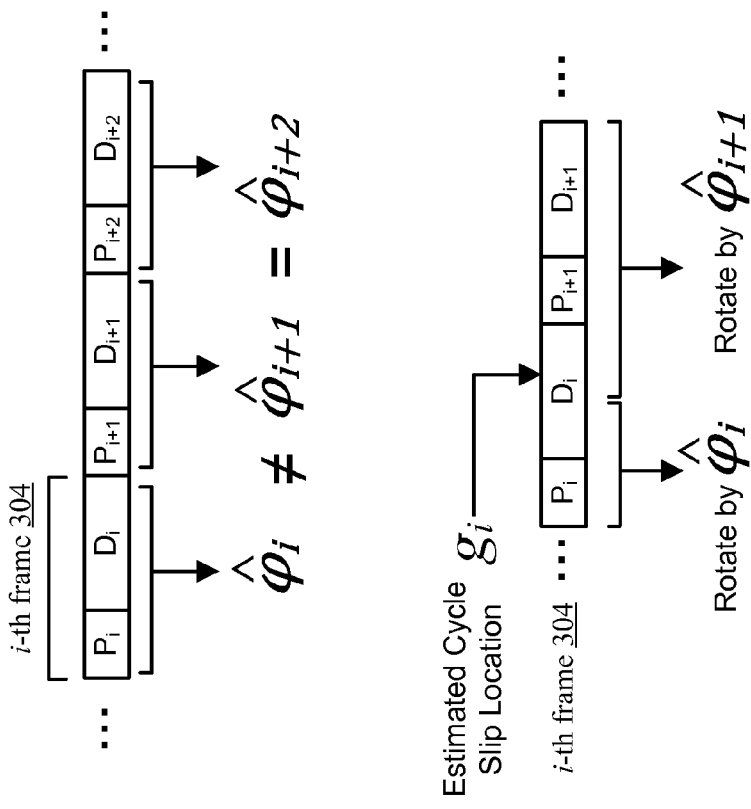
FIG. 7 illustrates an example of data processed at various stages of a data recovery system.

FIG. 7 illustrates an example of data processed by the data recovery system of FIG. 6. An input sequence of data frames is received, with each data frame having a data symbol block D and a pilot symbol block P. For each frame, the PA-CSD 634 determines the estimated phase offset (e.g., . . . $\hat{\phi}_i$, $\hat{\phi}_{i+1}$, $\hat{\phi}_{i+2}$ . . . ) as described above. The PA-CSD 634 determines that $\hat{\phi}_i \neq \hat{\phi}_{i+1}$ and therefore a cycle slip is detected in the ith frame. The PFE 652 then estimates the exact location $g_i$ of the cycle slip in the ith frame in accordance with equation

(10) above. Symbols prior to the cycle slip location are then rotated by $\hat{\phi}_i$ while symbols after the cycle slip location are rotated by $\hat{\phi}_{i+1}$.

Figure 8:
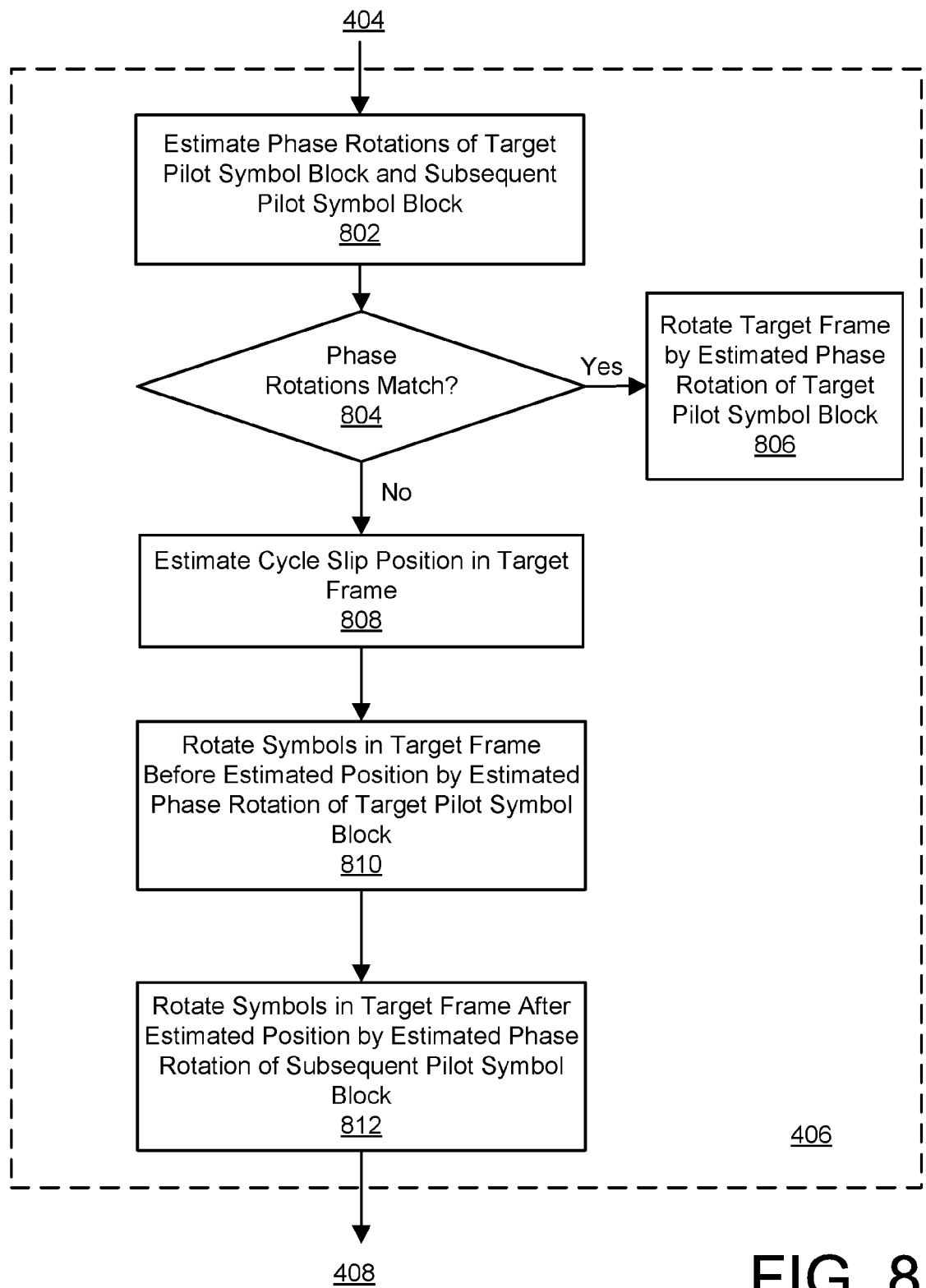
FIG. 8 is a flowchart illustrating a second embodiment of a process for detecting and correcting for cycle slips.

FIG. 8 illustrates an embodiment of a process for detecting and correcting for cycle slips that may be used to carry out step 406 of FIG. 4 consistent with the architecture of FIG. 6. Phase rotations are estimated 802 for a target pilot symbol block of a target frame (e.g., ith frame) and for a subsequent pilot symbol block of a subsequent frame (e.g., i+1th frame). If the phase rotations $\hat{\phi}_i$, $\hat{\phi}_{i+1}$ match in step 804, then the symbols of the target frame are rotated 806 by the estimated phase rotation $\hat{\phi}_i$ of the target frame. On the other hand, if the phase rotations $\hat{\phi}_i$, $\hat{\phi}_{i+1}$ do not match is step 804, a cycle slip is detected in the ith frame. The PFE 652 then estimates 808 the exact location of the cycle slip in the ith frame. The symbols of the target frame prior to the estimated location of the cycle slip are rotated 810 by the estimated phase rotation $\hat{\phi}_i$ of the target frame, and the symbols of the target frame after the estimated location of the cycle slip are rotated 812 by the estimated phase rotation $\hat{\phi}_{i+1}$ of the subsequent frame.

Although the detailed description contains many specifics, these should not be construed as limiting the scope but merely as illustrating different examples and aspects of the described embodiments. It should be appreciated that the scope of the described embodiments includes other embodiments not discussed in detail above. For example, the functionality of the various components and the processes described above can be performed by hardware, firmware, software, and/or combinations thereof.

Various other modifications, changes and variations which will be apparent to those skilled in the art may be made in the arrangement, operation and details of the method and apparatus of the described embodiments disclosed herein without departing from the spirit and scope of the invention as defined in the appended claims. Therefore, the scope of the invention should be determined by the appended claims and their legal equivalents.

What is claimed is:

1. A method for compensating for cycle slips in a coherent detection based receiver, the method comprising:
    receiving a sequence of frames, each frame comprising a data symbol block and a pilot symbol block, the pilot symbol block comprising one or more pilot symbols, the sequence of frames including at least a target frame and a subsequent frame;
    estimating a first phase rotation of the target frame based on pilot symbols in the target frame and an expected sequence of pilot symbols;
    estimating a second phase rotation of the subsequent frame based on pilot symbols in the subsequent frame and the expected sequence of pilot symbols;
    responsive to the first phase rotation not matching the second phase rotation, detecting a location of a cycle slip in the target frame; and
    correcting the cycle slip based on the detected location and the first and second phase rotations.

2. The method of claim 1, further comprising:
    estimating a third phase rotation of a third frame following the subsequent frame based on pilot symbols in the third frame and the expected sequence of pilot symbols; and
    responsive to the third phase rotation matching the second phase rotation, rotating the subsequent frame by the second phase rotation.

3. The method of claim 1, wherein correcting the cycle slip based on the detected location comprises:
    applying the first phase rotation to symbols of the target frame occurring prior to the detected location; and
    applying the second phase rotation to symbols of the target frame occurring after the detected location.

4. The method of claim 1, wherein detecting the location of the cycle slip in the target frame comprises:
    estimating the location based on a phase estimation from a carrier phase estimator.

5. The method of claim 1, wherein estimating the first phase rotation comprises selecting from a predefined set of possible phase rotations, the predefined set of possible phase rotations corresponding to phases of a symbol space of pilot symbols in the expected sequence of pilot symbols.

6. The method of claim 5, wherein selecting from the predefined set of possible phase rotations comprises:
    determining a likelihood of each of the possible phase rotations based on the pilot symbols in the target frame and the expected sequence of pilot symbols; and
    selecting the phase rotation having a maximum likelihood.

7. The method of claim 6, wherein determining the likelihood comprises computing a Euclidean distance between the pilot symbols in the target frame and the expected sequence of pilot symbols.

8. The method of claim 6, wherein determining the likelihood comprises:
    slicing the pilot symbols of the target frame to map each of the pilot symbols of the target frame to a nearest constellation point; and
    computing a Euclidean distance between the sliced pilot symbols of the target frame and the expected sequence of pilot symbols.

9. A non-transitory computer-readable storage medium storing instructions for compensating for cycle slips in a coherent detection based receiver, the instructions when executed by a processor causing the processor to perform steps including:
    receiving a sequence of frames, each frame comprising a data symbol block and a pilot symbol block, the pilot symbol block comprising one or more pilot symbols, the sequence of frames including at least a target frame and a subsequent frame;
    estimating a first phase rotation of the target frame based on pilot symbols in the target frame and an expected sequence of pilot symbols;
    estimating a second phase rotation of the subsequent frame based on pilot symbols in the subsequent frame and the expected sequence of pilot symbols;
    responsive to the first phase rotation not matching the second phase rotation, detecting a location of a cycle slip in the target frame; and
    correcting the cycle slip based on the detected location and the first and second phase rotations.

10. The non-transitory computer-readable storage medium of claim 9, the instructions when executed by the processor further causing the processor to perform steps including:
    estimating a third phase rotation of a third frame following the subsequent frame based on pilot symbols in the third frame and the expected sequence of pilot symbols; and
    responsive to the third phase rotation matching the second phase rotation, rotating the subsequent frame by the second phase rotation.

11. The non-transitory computer-readable storage medium of claim 9, wherein correcting the cycle slip based on the detected location comprises:

applying the first phase rotation to symbols of the target frame occurring prior to the detected location; and applying the first phase rotation to symbols of the target frame occurring after the detected location.

12. The non-transitory computer-readable storage medium of claim 9, wherein detecting the location of the cycle slip in the target frame comprises:

estimating the location based on a phase estimation from a carrier phase estimator.

13. The non-transitory computer-readable storage medium of claim 9, wherein estimating the first phase rotation comprises selecting from a predefined set of possible phase rotations, the predefined set of possible phase rotations corresponding to phases of a symbol space of pilot symbols in the expected sequence of pilot symbols.

14. The non-transitory computer-readable storage medium of claim 13, wherein selecting from the predefined set of possible phase rotations comprises:

determining a likelihood of each of the possible phase rotations based on the pilot symbols in the target frame and the expected sequence of pilot symbols; and selecting the phase rotation having a maximum likelihood.

15. The non-transitory computer-readable storage medium of claim 14, wherein determining the likelihood comprises computing a Euclidean distance between the pilot symbols in the target frame and the expected sequence of pilot symbols.

16. The non-transitory computer-readable storage medium of claim 14, wherein determining the likelihood comprises:

slicing the pilot symbols of the target frame to map each of the pilot symbols of the target frame to a nearest constellation point; and computing a Euclidean distance between the sliced pilot symbols of the target frame and the expected sequence of pilot symbols.

17. A receiver comprising:

a carrier phase recovery block configured to output a sequence of frames based on a received signal, each frame comprising a data symbol block and a pilot symbol block, the pilot symbol block comprising one or more pilot symbols, the sequence of frames including at least a target frame and a subsequent frame;

a cycle slip detection block configured to estimate a first phase rotation of the target frame based on pilot symbols in the target frame and an expected sequence of pilot symbols, to estimate a second phase rotation of the subsequent frame based on pilot symbols in the subsequent frame and the expected sequence of pilot symbols, and responsive to the first phase rotation not matching the second phase rotation, to detect a location of a cycle slip in the target frame; and a phase correction block configured to correct the cycle slip based on the detected location and the first and second phase rotations.

18. The receiver of claim 17, wherein the cycle slip detection block is further configured to estimate a third phase rotation of a third frame following the subsequent frame based on pilot symbols in the third frame and the expected sequence of pilot symbols; and wherein the phase correction block further rotates the subsequent frame by the second phase rotation responsive to the cycle slip detection block determining that the third phase rotation matches the second phase rotation.

19. The receiver of claim 17, wherein the phase correction block is configured to:

apply the first phase rotation to symbols of the target frame occurring prior to the detected location; and apply the second phase rotation to symbols of the target frame occurring after the detected location.

20. The receiver of claim 17, wherein the carrier phase recovery block comprises a carrier phase estimator configured to generate a phase estimation and the cycle slip detection block comprises a position estimator configured to estimate the location based on the phase estimation from the carrier phase estimator.

* * * * *